United States Patent
Arcella et al.

(10) Patent No.: US 7,091,295 B2
(45) Date of Patent: Aug. 15, 2006

(54) AMORPHOUS PERFLUORINATED POLYMERS

(75) Inventors: Vincenzo Arcella, Milan (IT); Marco Apostolo, Novara (IT); Francesco Triulzi, Milan (IT)

(73) Assignee: Solvay Solexis S.p.A., Milan (IT)

( * ) Notice: Subject to any disclaimer, the term of this patent is extended or adjusted under 35 U.S.C. 154(b) by 0 days.

(21) Appl. No.: 10/835,288

(22) Filed: Apr. 30, 2004

(65) Prior Publication Data

US 2004/0242820 A1 Dec. 2, 2004

(30) Foreign Application Priority Data

Apr. 15, 2003 (IT) .......................... MI2003A0773

(51) Int. Cl.
*C08F 116/12* (2006.01)

(52) U.S. Cl. ...................... 526/247; 526/250; 526/253; 526/255

(58) Field of Classification Search ................ 526/247, 526/250, 253, 255
See application file for complete search history.

(56) References Cited

U.S. PATENT DOCUMENTS

| | | | |
|---|---|---|---|
| 4,743,658 A | 5/1988 | Imbalzano et al. | |
| 4,789,717 A | 12/1988 | Giannetti et al. | |
| 4,864,006 A | 9/1989 | Giannetti et al. | |
| 4,966,435 A | 10/1990 | Matsumoto et al. | |
| 4,990,283 A | 2/1991 | Visca et al. | |
| 5,495,028 A | 2/1996 | Navarrini et al. | |
| 5,498,682 A | 3/1996 | Navarrini et al. | |
| 5,883,177 A | 3/1999 | Colaianna et al. | |
| 5,883,477 A | 3/1999 | Wilber | |
| 6,469,116 B1 * | 10/2002 | Maccone et al. | 526/247 |
| 6,566,021 B1 * | 5/2003 | Wang | 430/5 |

FOREIGN PATENT DOCUMENTS

| | | |
|---|---|---|
| EP | 0 645 406 A1 | 5/1988 |
| EP | 0 919 060 B1 | 6/1999 |
| EP | 1 256 591 A1 | 11/2002 |
| EP | 1 256 592 A1 | 11/2002 |
| WO | WO 89/12240 | 12/1989 |

OTHER PUBLICATIONS

Pianca, Maurizio, et al., "End groups in fluoropolymers", Journal of Fluorine Chemistry 95, 1999, pp. 71-84.

\* cited by examiner

*Primary Examiner*—Helen L. Pezzuto
(74) *Attorney, Agent, or Firm*—Arent Fox, PLLC

(57) ABSTRACT

Use of amorphous perfluorinated polymers for preparing transparent films at 157 nm, said perfluorinated polymers being free from unstable ionic end groups COF, COOH or their amidic derivatives, esters or salts, said polymers formed by cyclic units deriving from perfluorodioxoles of formula:

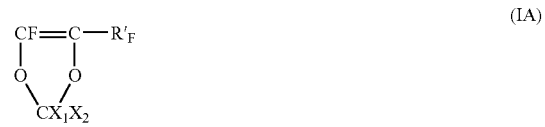

wherein $R'_F$ is equal to $R_F$ or $OR_F$ wherein $R_F$ is a perfluoroalkyl radical having 1–5 carbon atoms; $X_1$ and $X_2$, equal to or different from each other, are F, $CF_3$;
said polymers optionally containing units deriving from perfluorinated comonomers optionally containing oxygen atoms;
in said polymers the cyclic units deriving from the perfluorodioxoles of formula (IA) being $\geq 95\%$ by moles.

20 Claims, No Drawings

AMORPHOUS PERFLUORINATED POLYMERS

The present invention relates to amorphous perfluorinated polymers having a transmittance higher than 50%, preferably higher than 55% at a wave length of 157 nm, free from unstable ionic end groups, in particular COF, COOH or their corresponding esters, salts or amidic derivatives, said end groups being determined with the methods reported hereunder.

More specifically the present invention relates to amorphous perfluorinated polymers containing specific cyclic perfluorinated structures. Said polymers, characterized, as said, by a high transmittance at the wave-length of 157 nm, are usable for protective films in the semiconductor production by microlithographic techniques at 157 nm.

It is known that amorphous perfluorinatd polymers to be used in microlithographic applications, must show the lowest possible absorption with respect to the wave length of the incident light, in particular at 248 nm and 193 nm. Transparent films at 157 nm are also required to have smaller and smaller chips and information dense.

The known amorphous perfluorinated polymers have a good transparency at 248 nm and some of them also at 193 nm. However at the wave-length of 157 nm said polymers are not usable since they show high absorptions. Fluorinated polymers transparent at 157 nm are at present unknown and not available on the market.

Amorphous perfluorinated polymers are generally characterized by a high transmittance in a wide wave-length range, however at wave-lengths lower than 200 nm the transmittance is not high. This is mainly due to the fact that the amorphous fluoropolymers obtained by the known processes of the art show fluoropolymeric compositions having an unsatisfactory transmittance at wave lengths lower than 200 nm. Furthermore the amorphous perfluorinated polymers for the applications at wave lengths lower than 200 nm must contain the lowest possible amount of unstable ionic end groups, mainly of the COF, COOH$^+$type, absorbing at wave lengths lower than 200 nm reducing the transmittance of the amorphous fluorinated polymer films at these wave lengths.

Various processes to decrease or neutralize the residual amounts of said unstable ionic end groups are known in the art. They however do not allow to substantially eliminate the ionic end groups, in particular as regards the COF and COOH end groups.

One of the methods used to neutralize acid end groups in polymers is the fluorination: the fluorinating agent is generally elemental fluorine, but also other fluorinated agents are used.

The polymer can be fluorinated in solid form as described in U.S. Pat. No. 4,743,658, or dissolved in solvents stable to fluorination, as described in EP 919 060. The treatments are carried out at high temperatures, in particular of the order of 200° C., with fluorine diluted with an inert gas. Before the fluorination, a pre-treatment of the end groups with amines or tertiary alcohols can be carried out to facilitate the subsequent fluorination. The temperatures are in the range 75° C.–200° C. and must be lower than the polymer Tg. See WO 89/12240 and U.S. Pat. No. 4,966,435.

By these methods of the prior art it is obtained, as said, a reduction of unstable ionic end groups but not a complete elimination thereof.

In patent application EP 1 256 591 in the name of the Applicant, perfluorinated amorphous polymers substantially free from ionic end groups, in particular COF, COOH, their esters, salts or amidic derivatives have been described, by using the analysis methods reported hereunder. In the Examples polymers having transmittance values higher than 95% at the wave length of 200 nm are described, while the transmittance values at 157 nm are not reported. Furthermore there is no indication that can suggest the choice of fluoropolymers having a high transmittance value at 157 nm.

Another essential characteristic required to amorphous perfluorinated polymers for preparing transparent films at 157 nm is that the polymer has sufficient mechanical properties to allow the preparation of these manufactured articles.

The need was felt to have available amorphous perfluoropolymers for microlithographic applications, said fluoropolymers having a transmittance value at 157 nm higher than 50%, preferably higher than 55% and suitable mechanical properties for preparing transparent films at 157 nm.

The Applicant has unexpectedly and surprisingly found a specific class of amorphous perfluoropolymers solving the above technical problem.

An object of the present invention is the use of amorphous perfluorinated polymers for preparing transparent films at 157 nm, said perfluorinated polymers being completely free from unstable ionic end groups COF, COOH or their amidic derivatives, esters or salts, said polymers formed of cyclic units deriving from perfluorodioxoles of formula:

wherein R'$_F$, is equal to R$_F$ or OR$_F$ wherein R$_F$ is a linear or branched perfluoroalkyl radical having 1–5 carbon atoms, preferably R'$_F$=OCF$_3$; X$_1$ and X$_2$, equal to or different from each other, are F, CF$_3$, preferably X$_1$=X$_2$=F;

said polymers optionally containing units deriving from perfluorinated comonomers containing at least one ethylene type unsaturation, optionally containing oxygen atoms; the cyclic units being ≧95% by moles, more preferably >97% by moles, still more preferably being 100% by moles.

The amorphous perfluorinated polymers used in the present invention also show the following combination of properties:

Tg, determined according to the ASTM 3418 (DSC) method, from 180° C. to 1950° C., preferably from 190° C. to 192° C.;

intrinsic viscosity, determined at the temperature of 30° C. in perfluoroheptane (Galden® D 80) according to the ASTM D 2857-87 method, higher than 13 cc/g, generally up to 100 cc/g.

The unstable ionic end groups are not detectable in the amorphous perfluorinated polymers of the present invention by using the analysis method described hereunder.

The analysis method whereby the complete absence of unstable ionic end groups is determined, is carried out by Fourier Transform IR spectroscopy by Nicolet® Nexus FT-IR equipment (256 scannings, resolution 2 cm$^{-1}$), wherein on a sintered polymer powder pellet having a diameter of 5 mm with a thickness from 50 to 300 micron (1.75–10.5 mg of polymer) a scanning between 4000 cm$^{-1}$ and 400 cm$^{-1}$ is initially carried out, then by maintaining the pellet for 12 hours in an environment saturated with ammonia vapours, then recording the IR spectrum under the same conditions of the initial IR spectrum; by elaborating the two spectra by subtracting from the signals of the spectrum related to the untreated specimen (starting spectrum) the corresponding signals of the specimen spectrum after exposure to ammonia vapours, obtaining the "difference" spectrum, which is normalized by the following equation:

$$\frac{\text{"Difference spectrum"}}{[\text{pellet weight (g)/pellet area (cm}^2)]}$$

by measuring the optical densities related to the COOH and COF end groups after the reaction with the ammonia vapours, end groups giving rise with this reactant to detectable peaks; the optical densities are converted into mmoles/kg of polymer by using the extinction coefficients reported in Table 1, page 73 of the publication by M. Pianca et Al. "End groups in fluoropolymers", J. Fluorine Chem. 95 (1999), 71–84 (herein incorporated by reference); the found values show the concentrations of the residual polar end groups in mmoles of polar end groups/kg of polymer: in the polymer spectrum peaks related to COOH groups (wave length 3600–3500, 1820–1770 cm$^{-1}$) and/or COF groups (1900–1830 cm$^{-1}$) are not detectable.

The (co)polymer spectra according to the present invention, after fluorination, in correspondence of the above mentioned wave length ranges, do not show peaks distinguishable from the irregularities of the IR spectrum base line.

The analysis method of the ionic end groups used herein allows to detect amounts of each end group until the lower limit of 0.05 mmoles/Kg of polymer; in the case of the perfluorinated amorphous polymers of the present invention the IR spectrum, as said, does not show peaks distinguishable from the irregularities of the base line.

The Applicant has unexpectedly found, see the comparative Examples, that in the case of the TTD homopolymers and TTD copolymers wherein TTD ≧95% by moles of the prior art (U.S. Pat. No. 5,495,028 and U.S. Pat. No. 5,883,477) after having been subjected to the above fluorinated process, IR spectra according to the above method are obtained, showing that the peaks corresponding to the —COOH and/or —COF groups are not completely absent.

In other terms the spectra of said copolymers of the prior art, after fluorinantion, show residual peaks, not quantifiable since lower than the method sensitivity limits (0.05 mmoles/Kg), but clearly visible and distinguishable from the irregularities of the base line.

Preferably in formula (IA) of the perfluorodioxoles R'$_F$=OCF$_3$, X$_1$=X$_2$=F.

The optional comonomers usable in the amorphous perfluorinated copolymer of the present invention are, for example, one or more of the following:

C$_2$–C$_8$ perfluoroolefins, as tetrafluoroethylene (TFE) hexafluoropropene (HFP);
CF$_2$=CFOR$_f$ perfluoroalkylvinylethers (PAVE), wherein R$_f$ is a C$_1$–C$_6$ perfluoroalkyl, for example CF$_3$, C$_2$F$_5$, C$_3$F$_7$;
CF$_2$=CFOX perfluoro-oxyalkylvinylethers, wherein X is a C$_1$–C$_{12}$ alkyl, or a C$_1$–C$_{12}$ oxyalkyl, or a C$_1$–C$_{12}$ (per)fluoro-oxyalkyl having one or more ether groups, for example perfluoro-2-propoxy-propyl;
perfluorodioxoles, wherein in formula (IA) R'$_F$=F; X$_1$ and X$_2$, equal to or different from each other, are selected between F or R$_F$, preferably X$_1$=X$_2$=CF$_3$;
perfluorovinylethers (MOVE) of general formula CFX$_{AI}$=CX$_{AI}$OCF$_2$OR$_{AI}$ (A-I) wherein R$_{AI}$ is a C$_2$–C$_6$ linear, branched perfluoroalkyl group, or C$_1$–C$_6$ cyclic, or a C$_2$–C$_6$ linear, branched perfluoro oxyalkyl group containing from one to three oxygen atoms; R$_{AI}$ can optionally contain from 1 to 2 atoms, equal or different, selected from the following: Cl, Br, I; X$_{AI}$=F; the compounds (MOVE I) CF$_2$=CFOCF$_2$OCF$_2$CF$_3$ and (MOVE II) CF$_2$=CFOCF$_2$OCF$_2$CF$_2$OCF$_3$ are preferred.

Preferably the homopolymers of the perfluorodioxoles of formula (IA), wherein R'F=OCF$_3$' X$_1$=X$_2$=F, are used.

The homopolymers and copolymers of the dioxoles of formula (IA) are prepared by a process comprising a polymerization step wherein the reaction mixture does not come into contact with metal surfaces, followed by fluorination in solution in fluorinated solvents to eliminate the unstable ionic end groups.

The polymerization step is carried out in emulsion, suspension or microemulsion and is characterized in that the reaction temperature is lower than 60° C., preferably from 30° C. to 50° C. and in the used reactor, as said, the reaction mixture does not come into contact with metal surfaces.

The radical initiators are for example alkaline or ammonium persulphates, superphosphates, perborates or percarbonates, optionally in combination with ferrous, cuprous or silver salts or other easily oxidizable metals.

When the emulsion polymerization is used, in the reaction medium also anionic, cationic and non ionic, hydrogenated and fluorinated surfactants are usually present, those fluorinated are particularly preferred.

Among the fluorinated surfactants, those anionic having formula:

are particularly preferred, wherein R$^3_f$ is a C$_5$–C$_{16}$ (per)fluoroalkyl chain or a (per)fluoropolyoxyalkyl chain, X$^-$ is —COO$^-$ or —SO$_3^-$, M$^+$ is selected among: H$^+$, NH$_4^+$, alkaline metal ion. Among the most commonly used, the following are mentioned: ammonium perfluorooctanoate, (per)fluoropolyoxyalkylenes ended with one or more carboxyl groups, etc. See the patents U.S. Pat. No. 4,990,283 and U.S. Pat. No. 4,864,006.

When the suspension polymerization is used, as suspending agents, polyvinylalcohol, alkyl cellulose as, for example, methylcellulose, non ionic fluorinated surfactants are used.

Preferably the microemulsion polymerization of (per)fluoropolyoxyalkylenes is used, according to U.S. Pat. No. 4,789,717 and U.S. Pat. No. 4,864,006.

Optionally in the polymerization process chain transfers can also be used.

The polymerization reactor is preferably coated inside with glass or with inert materials, as enamels, fluorinated polymers, preferably perfluorinated polymers, in particular PTFE, MFA, PFA, FEP, PCTFE.

It is possible to also use entirely glass reactors.

Tests carried out by the Applicant have shown that by using the metal material reactors, for example steel, in particular Hastelloy® and AISI 316, commonly used in the preparation of fluoropolymers, it is not possible to obtain the amorphous homopolymers of the present invention having good mechanical properties, so to allow the prepartion of films for microlithographic applications. Furthermore, corrosion phenomena are noticed on the metal parts of the reactor in contact with the polymerization mixture.

Therefore the preparation by microemulsion polymerization in steel reactors of TTD polymers having the combination of the above properties cannot be carried out, in particular when TTD copolymers having a TTD content higher than or equal to 95% by moles, are prepared.

With the above polymerization process high conversions, even higher than 90%, are obtained. It is possible to obtain also quantitative conversions. Besides, the unreacted monomer can be recovered and reused.

As said, the invention polymers obtainable by means of the above process show suitable mechanical properties for microlithographic applications.

In particular the films produced with the polymers of the present invention detache without breaking from the support where they have been formed. Furthermore the mechanical properties measured according to the ASTM D 638 method are good: the elastic modulus is higher than 1,000 MPa and the stress at break is higher than 20 MPa. The polymers based on the dioxoles of formula (IA) prepared according to the prior art do not allow the determination of the mechanical properties according to the above method since the obtained specimens are brittle and do not resist under the test conditions.

Therefore these polymers of the prior art, besides having an insufficient transparency for applications at 157 nm, have unsuitable mechanical properties for the use according to the present invention.

The fluorination step in solution of the amorphous perfluorinated polymer is carried out by treatment with elemental fluorine, optionally in admixture with inert gases, of the polymer in solution of an inert solvent to fluorination, in the presence of UV radiations having wave lengths from 200 to 500 nm, operating at temperatures lower than 100° C., for reaction times from 10 h, preferably from 20 h, up to 60 h.

The used radiation has wave length ranging from 200 to 500 nm, emitted for example from a Hanau TQ 150 mercury lamp.

The fluorination temperature preferably ranges from 0° C. to +100° C., preferably from +20° C. to +50° C.

Preferably the polymer concentration in the perfluorinated solvent is comprised between 1 and 10% by weight.

The perfluorinated solvents usable in the fluorination are, for example, perfluoroalkanes, perfluoropolyethers, preferably having a boiling point lower than 200° C., as, for example, Galden® LS165; tertiary perfluoroamines, etc.

The fluorination process to eliminate the ionic end groups is followed by taking samples from the reaction mixture and by analyzing the end group presence by IR spectroscopy, with the above method. The process ends when peaks referred to COOH groups (3600–3500 $cm^{-1}$, 1820–1770 $cm^{-1}$) and/or COF groups (1900–1830 $cm^{-1}$) are no longer detectable.

Unexpectedly with the process of the present invention amorphous perfluorinated polymers are obtained containing cyclic units deriving from one or more perfluorodioxoles of formula (IA), said polymers having a high transmittance at the wave length of 157 nm, as required for lithographic applications.

The Applicant has unexpectedly and surprisingly found that by using the above process it is possible to prepare films and membranes showing suitable mechanical properties for preparing protective membranes for microlithographies, in particular at 157 nm. If the processes described in U.S. Pat. No. 5,498,682 and U.S. Pat. No. 5,883,177 are used for the polymerization, copolymers and homopolymers are obtained which, subjected to fluorination as above described, do not show complete absence of unstable ionic end groups; indeed they show peaks in the following wave length ranges: 3600–3500 $cm^{-1}$, 1820–1770 $cm^{-1}$, 1900–1830 $cm^{-1}$. Said peaks make the polymer of the prior art substantially free from polar end groups, however not yet suitable for applications at 157 nm.

The Applicant has found that the copolymers prepared according to the two above patents, after fluorination, show residual peaks not quantifiable since lower than the method sensitivity limit (0.05 mmoles/Kg), but clearly visible and distinguishable from the irregularities of the base line. By increasing the content in perfluorodioxole of formula (IA) in the perfluoropolymers, these peaks become still more distinguishable.

The amorphous perfluorinated polymers obtained according to the process of the present invention show good mechanical properties combined with a high transmittance at 157 nm. This particular combination of properties makes these polyemrs suitable for the production of membranes or protective films for microlithographic applications.

Furthermore it has been found that, with the process of the present invention, the polymer is free from metallic contaminations. This represents an advantage to obtain high film resistance under the typical irradiation conditions of the microlithography at 157 nm.

The transparent membranes or protective films are applied by casting, spin coating, or by other conventional methods, starting from solutions of amorphous perfluorinated polymers in perfluorinated solvents.

The used solvents are selected from the following: perfluoroalkanes, perfluoropolyethers, preferably having a boiling point lower than 200° C., as, for example, Galden® LS165; tertiary perfluoroamines, etc.

Among said solvents, the perfluoropolyethers having a linear structure containing repeating units ($OCF_2$) and ($OCF_2CF_2$) in the chain are particularly preferred.

The polymer concentration in said solvents is from 1 to 10%.

The invention polymers can be used even at wave lengths higher than 157 nm, in particular 193 and 248 nm, thus making available a single polymeric material for the various microlithographic techniques using different wave lengths.

The polymers of the present invention resist the UV irradiation during the microlithographic process. Instead the non perfluorinated polymers are not suitable for the applications and for the preparation of transparent membranes at 157 nm.

The following Examples illustrate the invention and do not limit the scope thereof.

EXAMPLES

Determination of the Polymer Tq

The Tg is determined according to the ASTM 3418 method.

Determination of the Intrinsic Viscosity

The intrinsic viscosity is determined at 30° C. in perfluoroheptane (Galden® D80) according to the ASTM D 2857-87 method.

IR Spectroscopy to Check the Absence of Ionic End Groups

The IR spectroscopy is carried out by Fourier Transform by Nicolet® Nexus FT-IR equipment (256 scannings, resolution 2 $cm^{-1}$), by using a sintered polymer powder pellet having a diameter of 5 mm with a thickness from 50 to 300 micron (1.75–10.5 mg of polymer), initially effecting a scanning between 4000 $cm^{-1}$ and 400 $cm^{-1}$, then maintaining the pellet for 12 hours in environment saturated with ammonia vapours and then recording the IR spectrum under the same conditions of the initial spectrum; by elaborating the two spectra by subtracting from the signals of the spectrum relating to the untreated specimen (starting spectrum) the corresponding signals of the specimen spectrum after exposure to the ammonia vapours, obtaining the "difference" spectrum, which is normalized by the following equation:

$$\frac{\text{"Difference spectrum"}}{[\text{pellet weight (g)/pellet area (cm}^2)]}$$

by measuring the optical densities related to the COOH and COF end groups after the reaction with the ammonia vapours, end groups giving rise with this reactant to detectable peaks; the optical densities are converted into mmoles/kg of polymer by using the extinction coefficients reported in Table 1, page 73 of the publication by M. Pianca et Al. "End groups in fluoropolymers", J. Fluorine Chem. 95 (1999), 71–84 (herein incorporated by reference); the found values show the concentrations of the residual polar end groups in mmoles of polar end groups/kg of polymer.

Transmittance Determination at 157 nm

A copolymer solution at 10% by weight is filtered on porous septum of 0.2 micron and filmed by casting, obtaining a film having a thickness of 20 micron.

The film transmittance is measured at 157 nm by a UV-Visible Perkin Elmer Lambda 2 spectrometer.

Example 1 (Comparative)

Copolymer Preparation TFE/TTD 20/80 Using an AISI 316 Reactor and a Temperature of 75° C.

In a 5 litres AISI 316 autoclave, equipped with stirrer working at 650 rpm, after vacuum has been made by an oil pump, there are introduced in sequence 2,790 ml of demineralized water, 6.67 g/litre $H_2O$ of microemulsion obtained by mixing:

7.5 ml of a perfluoropolyoxyalkylene having acid end group of formula:

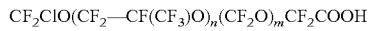

$$CF_2ClO(CF_2-CF(CF_3)O)_n(CF_2O)_mCF_2COOH$$

wherein n/m=10, having average molecular weight 600;
7.5 ml of an aqueous solution of $NH_3$ 30% by volume;
15 ml of demineralized water;
4.5 ml of Galden® D02 of formula:

$$CF_3O(CF_2-CF(CF_3)O)_n(CF_2O)_mCF_3$$

wherein n/m=20, having average molecular weight 450.

The autoclave is heated to 75° C. and at this temperature 33.3 g/litre $H_2O$ of TTD are added. The pressure inside the autoclave is brought to 1.4 MPa by TFE gas. Subsequently 210 ml of a 0.0925 M potassium persulphate solution are introduced. After about 10 minutes the reaction starts. The reaction pressure is maintained constant by feeding in a semicontinuous way, at every decrease of the internal pressure of 0.05 MPa, liquid TTD and gaseous TFE in the ratio by weight TTD/TFE=1.4. The reaction ends after having fed about 320 g overall of TTD. The latex is degassed and results to have a solid concentration 15% by weight. It is coagulated by adding $HNO_3$ at 65% w/w, the polymer is separated from the aqueous phase, washed twice with demineralized water and dried in stove at 85° C. for 100 h.

The polymer Tg is of about 134.7° C., corresponding to a composition by moles 20/80 TFE/TTD. The intrinsic viscosity measured at 30° C. in perfluoroheptane (Galden® D80) is equal to 36.6 cc/g. By IR analysis the polymer results to contain a residual amount of unstable ionic groups COOH of 6 mmoles/Kg.

Example 1A (Comparative)

Fluorination of Unstable Ionic Groups of the Copolymer Obtained in Example 1 (Comparative).

420 g of solution at 5% by weight of copolymer obtain in the Example 1 (comparative) dissolved in perfluorinated solvent Galden® D100 (perfluoropolyether having b.p. 100° C.), are introduced in a 300 ml photochemical glass reactor equipped with mechanical stirrer and a mercury vapour immersion UV lamp (Hanau TQ 150). Nitrogen is fed in the solution for 1 h to eliminate the oxygen present, then a mixture 1:1 by volume of nitrogen/fluorine is fed in the presence of UV radiations for 30 h at 25° C. After reaction the residual fluorine and the solvent are eliminated by a reduced pressure.

After 13 hours of fluorination, by IR analysis it is still found 1 mmole/kg of residual COOH end groups and 1.4 mmoles/kg of COF end groups formed by the reaction.

After 29 hours of fluorination, by IR analysis peaks attributable to COOH and COF end groups are not quantifiable.

However the spectrum shows peaks which distinguish themselves from the base line, even without expansion of the absorbance scale, in correspondence of the wave length ranges 3600–3500 and 1820–1770 $cm^{-1}$ related to the —COOH group and 1900–1830 $cm^{-1}$ related to the —COF group.

Transmittance measure at 157 nm: 5%.

Example 2

Preparation of the Copolymer TFE/TTD 3/97 by Moles

In a 1 litre autoclave, equipped with magnetic stirring after vacuum has been made by an oil pump, there are introduced in sequence 350 ml of demineralized water, 15 ml of microemulsion, obtained by mixing:

1.486 ml of a perfluoropolyoxyalkylene having acid end group of formula:

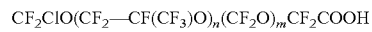

$$CF_2ClO(CF_2-CF(CF_3)O)_n(CF_2O)_mCF_2COOH$$

wherein n/m=10, having average molecular weight 600;
1.486 ml of an aqueous solution of $NH_3$ at 30% by volume;
2.973 ml of demineralized water;
9.054 ml of Galden® D02 of formula:

$$CF_3O(CF_2-CF(CF_3)O)_n(CF_2O)_mCF_3$$

wherein n/m=20, having average molecular weight 450.

174 g of TTD are added. 0.03 MPa of gaseous TFE equal to 0.72 g are introduced in the reactor. Subsequently 0.1 g of ammonium persulphate are introduced. The autoclave is heated to 50° C. The reaction is ended after 12 hours. The latex is degassed. It is coagulated by adding aluminum sulphate, the polymer is separated from the aqueous phase, washed twice with demineralized water and dried in a stove at 120° C. for 16 h.

The polymer Tg is about 184.5° C. The intrinsic viscosity measured at 30° C. in perfluoroheptane (Galden® D80) is equal to 22 cc/g. By IR analysis the polymer results to contain a residual amount of unstable ionic groups COOH of 6 mmoles/Kg.

Example 2A

Fluorination of the End Groups of the Copolymer Obtained in the Example 2 in the Presence of UV Light and Solvent Example 1A (comparative) is repeated but using the copolymer obtained in the Example 2.

The IR spectrum determined as above, also expanding the absorbance scale until well showing the base line oscillations due to the ground noise, does not show peaks detectable from the base line in correspondence of the wave length ranges 3600–3500 and 1820–1770 cm$^{-1}$ related to the —COOH group and 1900–1830 cm$^{-1}$ related to the —COF group.

The transmittance value at 157 nm results >50%.

Example 3 (Comparative)

Preparation of a Copolymer TFE/TTD 3/97 by Moles Using the Process of the Example 1 (Comparative)

One proceeds as in Example 1 (comparative) but introducing in the autoclave 0.03 MPa of TFE and by proceeding batchwise.

The polymer Tg is about 155° C. The intrinsic viscosity measured at 30° C. in perfluoroheptane (Galden® D80) is equal to 7 cc/g. By IR analysis the polymer results to contain a residual and analytically determinable amount of unstable ionic groups COOH.

Example 3A (Comparative)

Fluorination of the Unstable Ionic end Groups of the Copolymer of the Example 3 (Comparative) in the Presence of UV Light and Solvent The process described in the Example 1 is followed but using the copolymer of the Example 3 (comparative).

After 29 hours of fluorination, by IR analysis peaks attributable to COOH and COF end groups are not quantifiable. However the spectrum shows peaks which distinguish themselves from the base line, also without expansion of the absorbance scale, in correspondence of the wave length ranges 3600–3500 and 1820–1770 cm$^{-1}$ related to the —COOH group and 1900–1830 cm$^{-1}$ related to the —COF group.

The transmittance value at 157 nm has not been determined, peaks of the ionic end groups being present.

Example 4

Preparation of the Homopolymer TTD having Intrinsic Viscosity 20.1 cc/g

In a 0.5 litre glass autoclave, equipped with magnetic stirring, after vacuum has been made by an oil pump, there are introduced in sequence 150 ml of demineralized water, 1.5 g/litre H$_2$O of microemulsion, obtained by mixing:
0.11 ml of a perfluoropolyoxyalkylene having acid end group of formula:

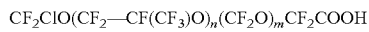

wherein n/m=10, having average molecular weight 600;
0.11 ml of an aqueous solution of NH$_3$ at 30% by volume;
0.22 ml of demineralized water;
0.67 ml of Galden® D02 of formula:

wherein n/m=20, having average molecular weight 450.

The autoclave is heated to 50° C. and at this temperature 100 g of TTD are added. Subsequently 1 g of potassium persulphate is introduced. The reaction ends after 96 hours. The latex is degassed. It is coagulated by adding HNO$_3$ 65% w/w, the polymer is separated from the aqueous phase, washed twice with demineralized water and dried in a stove at 85° C. for 100 h.

80 g of homopolymer (80% conversion) have been obtained.

The polymer Tg is about 191° C. The intrinsic viscosity measured at 30° C. in perfluoroheptane (Galden® D80) is equal to 20.1 cc/g. By IR analysis the polymer results to contain a residual amount of unstable ionic groups COOH of 6 mmoles/Kg.

Example 4A

Fluorination of the End Groups of the Copolymer Obtained in the Example 4 in the Presence of UV Light and Solvent Example 1A (comparative) is repeated but by using the homopolymer obtained in the Example 4.

The IR spectrum determined as above described, also expanding the absorbance scale until well showing the base line oscillations due to the ground noise, does not show peaks detectable from the base line in correspondence of the wave length ranges 3600–3500 and 1820–1770 cm$^{-1}$ related to the —COOH group and 1900–1830 cm$^{-1}$ related to the —COF group.

Transmittance value at 157 nm: >55%.

The invention claimed is:

1. A method for preparing transparent films at 157 nm having a transmittance higher than 50%, comprising the step of preparing solutions in perfluorinated solvents of amorphous perfluorinated polymers, said perfluorinated polymers being free from unstable ionic end groups, said polymers formed of cyclic units deriving from perfluorodioxoles of formula:

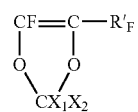

wherein R'$_F$ is equal to R$_F$ or OR$_F$ wherein R$_F$ is a linear or branched perfluoroalkyl radical having 1–5 carbon atoms; X$_1$ and X$_2$, equal to or different from each other, are F, CF$_3$;

said polymers optionally containing units deriving from perfluorinated comonomers containing at least one ethylene type unsaturation, optionally containing oxygen atoms;

in said polymers the cyclic units deriving from the perfluorodioxoles of formula (IA) being ≧95% by moles;

said ionic end groups being determined by means of the following method by using the Fourier Transform IR spectroscopy by FT-IR equipment (256 scannings, resolution 2 cm$^{-1}$):

on a polymer sintered powder pellet having a diameter of 5 mm with a thickness from 50 to 300 micron (1.75–10.5 mg of polymer) a scanning between 4000 cm$^{-1}$ and 400 cm$^{-1}$ is initially carried out, then the pellet is transferred for 12 hours in an environment saturated with ammonia vapours; at the end of this period the IR spectrum is recorded under the same conditions of the initial IR spectrum; by elaborating the two spectra by subtracting from the signals of the spectrum related to the untreated specimen (starting spectrum) the corresponding signals of the specimen spectrum after exposure to the ammonia vapours, drawing the "difference" spectrum, which is normalized by the following equation:

$$\frac{\text{"Difference spectrum"}}{[\text{pellet weight (g)/pellet area (cm}^2)]}$$

the optical densities related to the COOH and COF end groups after the reaction with the ammonia vapours, end groups giving rise with this reactant to detectable peaks, are determined; the optical densities are converted into mmoles/kg of polymer obtaining the concentrations of the residual polar end groups as mmoles of polar end groups/kg of polymer: in the polymer spectrum in the correspondence of the wave length of the peaks related to COOH groups and/or COF groups are not shown peaks which are detectable from the irregularities of the base line.

2. The method according to claim 1, wherein the unstable ionic end groups are COF, COOH or their amidic derivatives, esters or salts.

3. The method according to claim 1, wherein in formula (IA) of perfluorodioxoles $R'_F$=$OCF_3$, $X_1$=$X_2$=$F$.

4. The method according to claim 1 wherein the optional comonomer usable in the amorphous perfluorinated polymers is selected from one or more of the following:

$C_2$–$C_8$ perfluoroolefins;

$CF_2$=$CFOR_f$ perfluoroalkylvinylethers (PAVE), wherein $R_f$ is a $C_{1–C6}$ perfluoroalkyl;

$CF_2$=$CFOX$ perfluoro-oxyalkylvinylethers, wherein X is a $C_{1–C12}$ alkyl, or a $C_{1–C12}$ oxyalkyl, or a $C_{1–C12}$ (per)fluoro-oxyalkyl having one or more ether groups;

perfluorodioxoles, wherein in formula (IA) $R'_F$=F; $X_1$ and $X_2$, equal to or different from each other, are selected between F or $R_F$;

perfluorovinylethers (MOVE) of general formula $CFX_{AI}$=$CX_{AI}OCF_2OR_{AI}$ (A-I) wherein:

$R_{AI}$ is a linear, branched $C_2$–$C_6$ perfluoroalkyl group, or $C_5$–$C_6$ cyclic, or a $C_2$–$C_6$ linear, branched periluoro oxyalkyl group containing from one to three oxygen atoms; $R_{AI}$ can optionally contain from 1 to 2 atoms, equal or different, selected from the following: Cl, Br, I;

$X_{AI}$=F.

5. The method according to claim 1, wherein the polymers are homopolymers of the perfluorodioxoles of formula (IA), wherein $R'_F$=$OCF_3$, $X_1$=$X_2$=F.

6. The method according to claim 1, wherein the films are formed by casting, spin coating, or other conventional methods, starting from solutions of the amorphous perfluorinated polymers in perfluorinated solvents.

7. The method according to claim 6, wherein the perfluorinated solvents used for the polymer solutions are selected from the group consisting of perfluoroalkanes and perfluoropolyethers.

8. The method according to claim 6, wherein, as a solvent, perfluoropolyethers having a linear structure containing repeating units ($OCF_2$) and ($OCF_2CF_2$) in the chain, are used.

9. The method according to claim 1, wherein $R'_F$=$OCF_3$.

10. The method according to claim 1, wherein $X_1$=$X_2$=F.

11. The method according to claim 1, wherein the cyclic units deriving from the perfluorodioxoles of formula (IA) being >97% by moles.

12. The method according to claim 1, wherein the cyclic units deriving from the perfluorodioxoles of formula (IA) being 100% by moles.

13. The method according to claim 4, wherein the $C_2$–$C_8$ perfluoroolefins is tetrafluoroethylene (TFE) or hexafluoropropene (HFP).

14. The method according to claim 4, wherein $R_f$ is $CF_3$, $C_2F_5$, or $C_3F_7$.

15. The method according to claim 4, wherein X is perfluoro-2-propoxy-propyl.

16. The method according to claim 4, wherein $X_1$=$X_2$=$CF_3$.

17. The method according to claim 4, wherein the optional comonomer is of the general formula $CF_2$=$CFOCF_2OCF_2CF_2Y_{AI}$ (A-II), wherein $Y_{AI}$=F, $OCF_3$.

18. The method according to claim 17, wherein the optional comonomer is (MOVE I) $CF_2$=$CFOCF_2OCF_2CF_3$ or (MOVE II) $CF_2$=$CFOCF_2OCF_2CF_2OCF_3$.

19. The method according to claim 7, wherein the perfluorinated solvents have a boiling point lower than 200° C.

20. The method according to claim 19, wherein the perfluorinated solvents are tertiary perfluoroamines.

* * * * *